US012508730B2

(12) United States Patent
Xie

(10) Patent No.: US 12,508,730 B2
(45) Date of Patent: Dec. 30, 2025

(54) DUST-ABSORBING ELECTRIC SHAVER

(71) Applicant: Yayi Xie, Guangdong (CN)

(72) Inventor: Yayi Xie, Guangdong (CN)

( * ) Notice: Subject to any disclaimer, the term of this patent is extended or adjusted under 35 U.S.C. 154(b) by 155 days.

(21) Appl. No.: 18/619,383

(22) Filed: Mar. 28, 2024

(65) Prior Publication Data

US 2025/0303593 A1 Oct. 2, 2025

(51) Int. Cl.
*B26B 19/44* (2006.01)
*B26B 19/04* (2006.01)
*B26B 19/20* (2006.01)

(52) U.S. Cl.
CPC .............. *B26B 19/44* (2013.01); *B26B 19/04* (2013.01); *B26B 19/20* (2013.01)

(58) Field of Classification Search
CPC ....................................................... B26B 19/44
See application file for complete search history.

(56) References Cited

U.S. PATENT DOCUMENTS 2,950,530 A * 8/1960 Fox ......................... B26B 19/44 30/346.51
3,905,099 A * 9/1975 Bernstrom .............. B26B 19/44 30/41.5
4,475,285 A * 10/1984 Hara ....................... B26B 19/44 30/43.6
4,899,442 A * 2/1990 Horii ....................... B26B 19/44 30/34.2
5,153,994 A * 10/1992 Emmett .................. B26B 19/06 30/41.6
6,935,028 B2 * 8/2005 Cutting ................... B26B 19/20 30/526
8,484,853 B1 * 7/2013 Laube ..................... B26B 19/44 30/216
10,814,506 B2 * 10/2020 Darwinkel .......... B26B 19/3853
11,858,155 B1 * 1/2024 Ebrahimi Afrouzi ... B26B 19/20
2006/0174487 A1 * 8/2006 Andis ................... B26B 19/382 30/34.05
2008/0250649 A1 * 10/2008 Spigai ..................... B26B 19/40 30/133
2009/0277012 A1 * 11/2009 Mikula ................... B26B 19/44 30/41.6
2011/0185578 A1 * 8/2011 Landrie .................. A45D 44/00 132/200
2012/0318300 A1 * 12/2012 Panzer .................... B26B 19/44 55/495
2016/0361826 A1 * 12/2016 Musallam ............... B26B 19/06
(Continued)

*Primary Examiner* — Sean M Michalski

(57) ABSTRACT

The invention discloses a dust-absorbing electric shaver, comprising a housing, a shaver component, and a surface cover; the top of housing is provided with a fixed shell, and the shaver component is mounted on the top of fixed shell; a collection slot is formed between the front of housing and fixed shell for collecting beard residue, a panel is provided in the front of collection slot, and a collection chamber is formed between panel and collection slot; the panel and positioning plate are provided in mounting hole, a filtration component is provided in the middle of panel, and a cleaning mechanism is installed above filtration component to rotate the filtration component and remove excess beard residue on the surface. The structure is simple, and beard residue can be quickly inhaled into collection chamber via the automatic collection chamber and aspirator pump below in the process of shaving.

9 Claims, 8 Drawing Sheets

(56) References Cited

U.S. PATENT DOCUMENTS

| | | | | |
|---|---|---|---|---|
| 2017/0361479 | A1* | 12/2017 | Magrone | B26B 19/3886 |
| 2018/0333876 | A1* | 11/2018 | Darwinkel, I | B26B 19/44 |
| 2023/0415365 | A1* | 12/2023 | Ebrahimi Afrouzi | B26B 21/4056 |
| 2024/0335962 | A1* | 10/2024 | Huang | B26B 19/148 |

* cited by examiner

DUST-ABSORBING ELECTRIC SHAVER

1. TECHNICAL FIELD

The invention relates to the technical field of electric shaver, in particular to a dust-absorbing electric shaver.

2. BACKGROUND ART

Electric shaver is a personal care appliance that is primarily used to shave the face and neck. It usually consists of parts such as blades, motors and batteries or power adapters. Electric shavers can be categorized into two types: rotary and reciprocating. Rotary electric shavers use a circular shaver head driven by a motor to rotate shave the beard. This type of shaver is suitable for shaving short and soft beards. The reciprocating electric shaver uses a linear shaver head driven by an electric motor to perform rapid reciprocating movements to shave. This type of razor is suitable for shaving long, coarse and hard beards.

At present, the electric shaver is lack of dust-absorbing structure in use, resulting in part of the beard falling directly in the process of shaving, polluting the washstand or other platforms, and the subsequent cleaning is more troublesome, some beard crumbs will even fall into the neck, resulting in discomfort, and affecting the quality of shaving.

3. SUMMARY OF THE INVENTION

The technical problem to be solved by the invention is to provide a dust-absorbing electric shaver, which can absorb beard residue generated into the collection chamber quickly, and the collection chamber can be opened, which is convenient to clean, so as to solve the problem mentioned in the background art.

The invention is realized through the following technical solution: a dust-absorbing electric shaver, comprising a housing, a shaver component, and a surface cover; the top of said housing is provided with a fixed shell, and the shaver component is mounted on the top of fixed shell; a collection slot is formed between the front of housing and fixed shell for collecting beard residue, a panel is provided in the front of collection slot, and a collection chamber is formed between the panel and collection slot; the bottom surface of the collection chamber is provided with a mounting hole that is connected to the interior of the housing; the panel and positioning plate are provided in the mounting hole, a filtration component is provided in the middle of the panel, and a cleaning mechanism is installed above the filtration component to rotate the filtration component and remove excess beard residue on the surface; the bottom surface of the positioning plate is mounted with an aspirator pump that absorbs beard residue generated in the shaving process into the interior of the collection chamber.

As a preferred technical solution, the filtration component includes a conical shell and a conical filtering mesh cover, wherein the conical shell is mounted in the middle of the panel, the and middle of the panel is provided with an air inlet hole connected with the conical shell; the middle of the positioning plate is provided with a vent hole, and the inner diameter of the vent hole is smaller than the air inlet hole; the outside of the positioning plate is mounted on the inner wall of the housing, the filtering mesh cover is provided inside the conical shell, and the open end of the filtering mesh cover passes through the air inlet hole and is placed on the top surface of the positioning plate, and the outer ring surface of the filtering mesh cover is in contact with the inner ring surface of the conical shell; the cleaning mechanism is set on the top of the conical shell and is movably connected with the filtering mesh cover.

As a preferred technical solution, the cleaning mechanism includes a positioning rod, gear racks, a gear, a rotary shaft, a push rod, and the first sealing bearing; the top surface of the conical shell is provided with a through hole, and the first sealing bearing is mounted in the through hole; the rotary shaft is mounted in the inner ring of the first sealing bearing, and one end of the rotary shaft protrudes out to form a positioning portion; a positioning groove is provided on the top surface of the filtering mesh cover to match the positioning portion, and the positioning portion is inserted into the positioning groove; the other end of the rotary shaft is fixedly connected with the gear, and gear racks are set on one side of the gear and meshed with the gear; the push rod is installed at one end of the gear racks, and the other end of the push rod is installed with a squeeze ball; the outer ring surface of the squeeze ball is pressed against the inner side of the surface cover, and the other end of the gear racks is provided with a positioning hole; one end of the positioning rod is inserted into the positioning hole and is mounted with a compression spring, and the other end of the compression spring is installed in the inner surface of the positioning hole; the other end of the positioning rod is installed in the inner surface of the housing, and the compression spring is in a compressed state.

As a preferred technical solution, the top surface of the fixed shell is sunken to form the fixed groove, and the bottom surface of the fixed groove is provided with a plurality of slots; the lower end of the shaver component is inserted into the fixed groove, and the bottom surface of the shaver component directly opposite to slots protrudes to form snapping blocks, and the snapping blocks are inserted into the slots; the interior of the fixed shell is installed with a micro electric motor to drive the moving blades in the shaver component to realize shaving operation.

As a preferred technical solution, a "U" shaped adjustment channel is formed between the top surface of housing and the fixed shell, and a "U" shaped adjustment plate is provided in the adjustment channel; the upper end of the adjustment plate extends to the outside, and a comb is installed to adjust shaving length; inside the housing, an eccentric wheel is located below the adjustment plate to push the adjustment plate upward, and a shaft lever is mounted on the eccentric wheel; and a shaft hole is provided on the outer side of the housing directly opposite to the shaft lever, and a second sealing bearing is mounted inside the shaft hole; one end of the shaft lever is mounted in the inner ring of the second sealing bearing, and extending outward with an adjustment knob mounted thereon.

As a preferred technical solution, an impurity absorption channel for absorbing beard residue generated outside into the interior of the collection chamber is formed between the top surface of the housing and the surface cover.

As a preferred technical solution, the housing is located on both sides of the collection slot and is sunken to form a connection groove, the bottom of the connection groove is sunken to form an assembly groove connected to the collection slot; both sides of the surface cover are bent inwardly to form side portion, and the side portion is inserted into the connection groove and is fastened to the connection groove by snap-fit; the bottom of the surface cover is protruded to form the assembly portion, and the assembly portion is inserted into the assembly groove; the surface of the surface cover is sunken to form a groove to push the surface cover upwardly, and plurality of bumps that increase friction are protruded on the inner wall surface of the groove.

As a preferred technical solution, a plurality of exhaust ports are provided on both sides of the housing on the outside of the aspirator pump.

As a preferred technical solution, the panel is provided at the upper end of the top plate, and the bottom surface of the panel is embedded with a plurality of metal sheets, the top surface of the top plate directly opposite to the metal sheets is embedded with magnets, and the panel is magnetically fixed to the magnets on the positioning plate through the metal sheets.

The beneficial effects of the invention are as follows:

1. the housing and the surface cover are combined to form the collection chamber, the bottom of the collection chamber is provided with an inward aspirator device, in the process of shaving, the beard residue can be collected in the collection chamber along the impurity absorption channel, avoiding falling outward; and after the cover is opened, the beard residue can be quickly poured out from the interior of the collection chamber, and in the process of opening the surface cover, the elasticity of the compression spring can outwardly push the gear racks, and the gear racks synchronously drive the gear and shaft lever; rotation of shaft lever drives the filtering mesh cover, so that the residual impurities on the outside of filtering mesh cover can be pushed away, to avoid clogging and affect the quality of dust absorption;
2. The adjustment mechanism can change the distance of the comb stretching out, so as to change the distance between the comb and the shaver component, and then carry out shaving operation of different lengths;
3. the shaver component and fixed slot are fastened through snap-fit, so the shaver component can be pull out directly when in need of replacement, convenient for its cleaning and replacement.

4. BRIEF DESCRIPTION OF ACCOMPANY DRAWINGS

In order to illustrate the preferred embodiment of the invention or the technical scheme more clearly, the technical scheme of the preferred embodiment or the figures required by the prior art is further described briefly. Obviously, only partial embodiments of the invention are shown and the actual structure is not limited thereto. It is to be understood by those skilled in the art that other drawings can be obtained based on the drawings of the invention with non-creative labor.

Wherein: 1 housing, 2 surface cover, 3 comb, 4 exhaust port, 5 adjustment knob, 6 shaver component, 7 adjustment channel, 8 impurity absorption channel, 9 fixed groove, 11 panel, 12 positioning plate, 13 aspirator pump, 14 eccentric wheel, 15 shaft lever, 16 adjustment plate, 17 collection slot, 18 connection slot, 19 L-shape portion, 21 first fastening stripe, 22 assembly groove, 23 conical shell, 24 filtering mesh cover, 25 cleaning mechanism, 26 rotary shaft, 27 gear, 28 gear rack, 29 push rod, 31 positioning rod, 32 squeeze ball, 33 positioning groove.

5. SPECIFIC EMBODIMENT OF THE INVENTION

Embodiments of the invention are described in detail below, and examples of said embodiments are shown in the accompanying drawings, wherein the same or similar marking numbers throughout denotes the same or similar elements or elements having the same or similar function. The embodiments described below by reference to the accompanying drawings are exemplary and are intended solely for the purpose of explaining the invention and are not to be construed as a limitation of the invention.

All of the features disclosed in this specification, or all of the steps in the methods or processes disclosed, may be combined in any manner except for mutually exclusive features and/or steps.

Any of the features disclosed in this specification (including any appended claims, the abstract, and the accompanying drawings), unless specifically recited, may be replaced by other equivalent or alternative features having similar purposes. That is, unless specifically recited, each feature is but one example of a series of equivalent or similar features.

Figure 1:
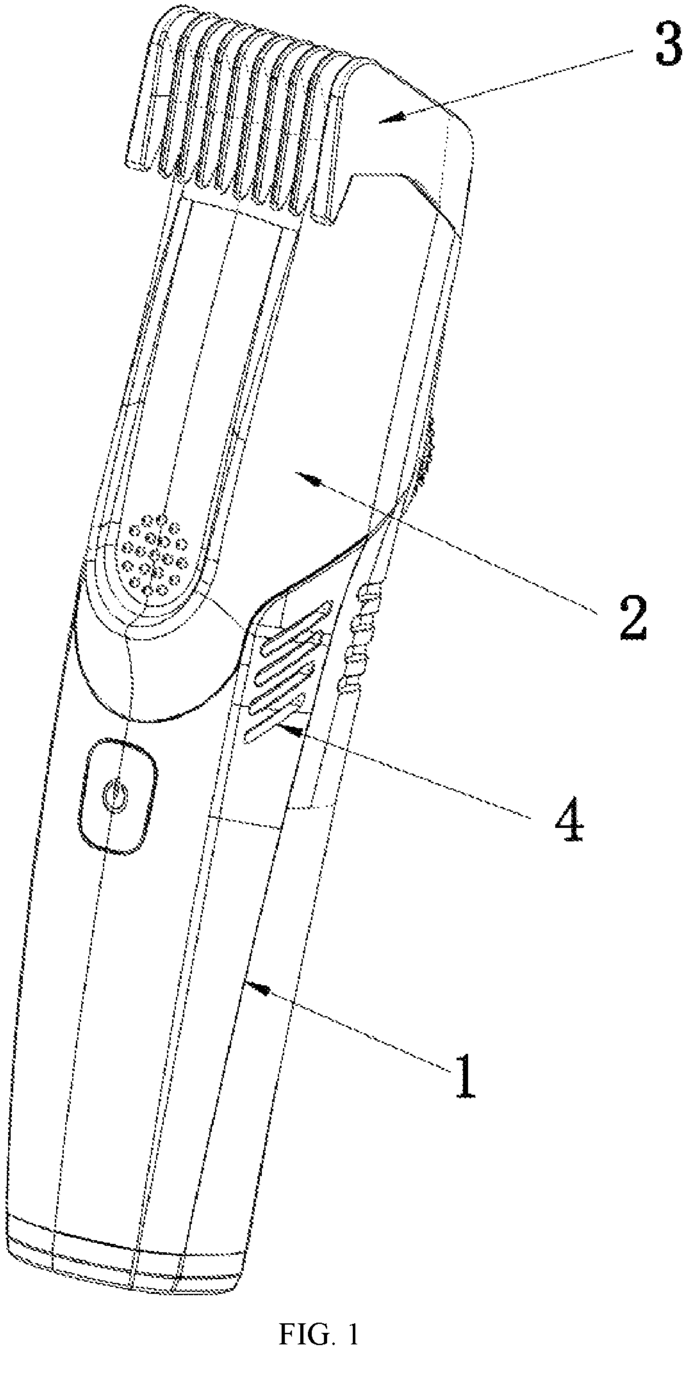
FIG. 1 is the overall structural diagram of the invention.
Figure 2:
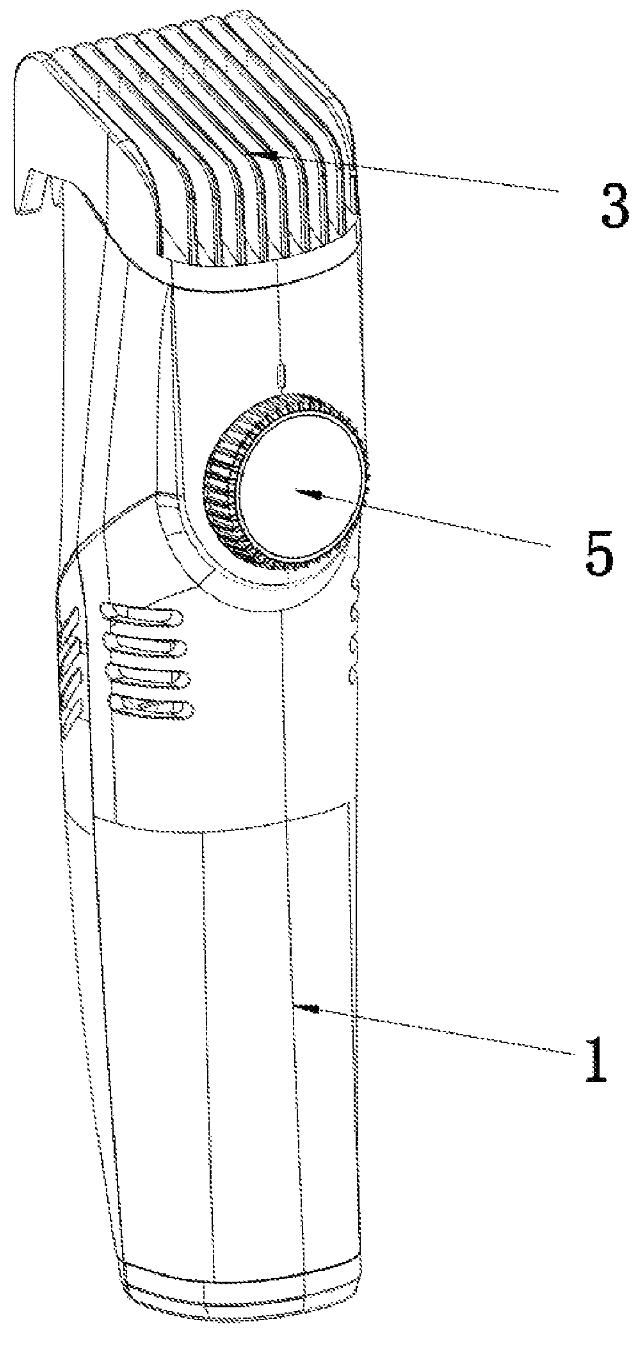
FIG. 2 is the side view of the invention.
Figure 3:
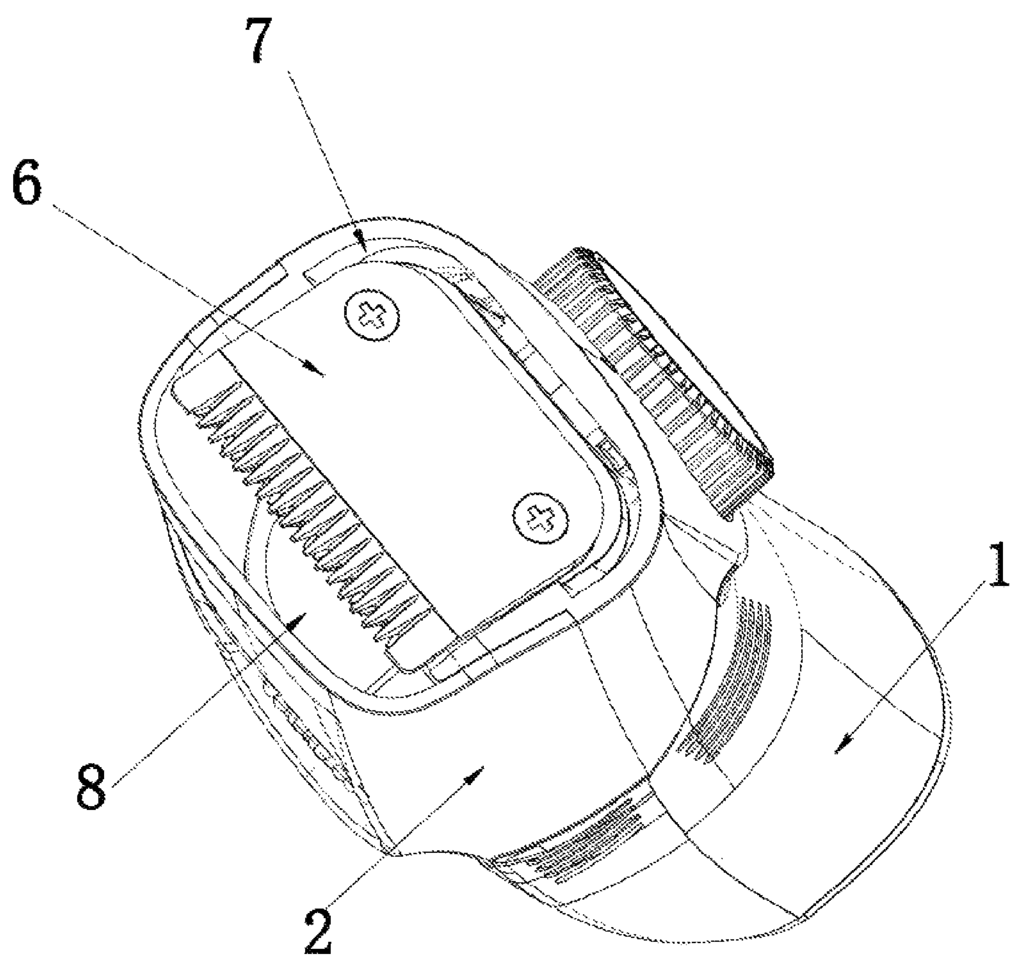
FIG. 3 is the structural diagram of the invention after comb is removed.
Figure 4:
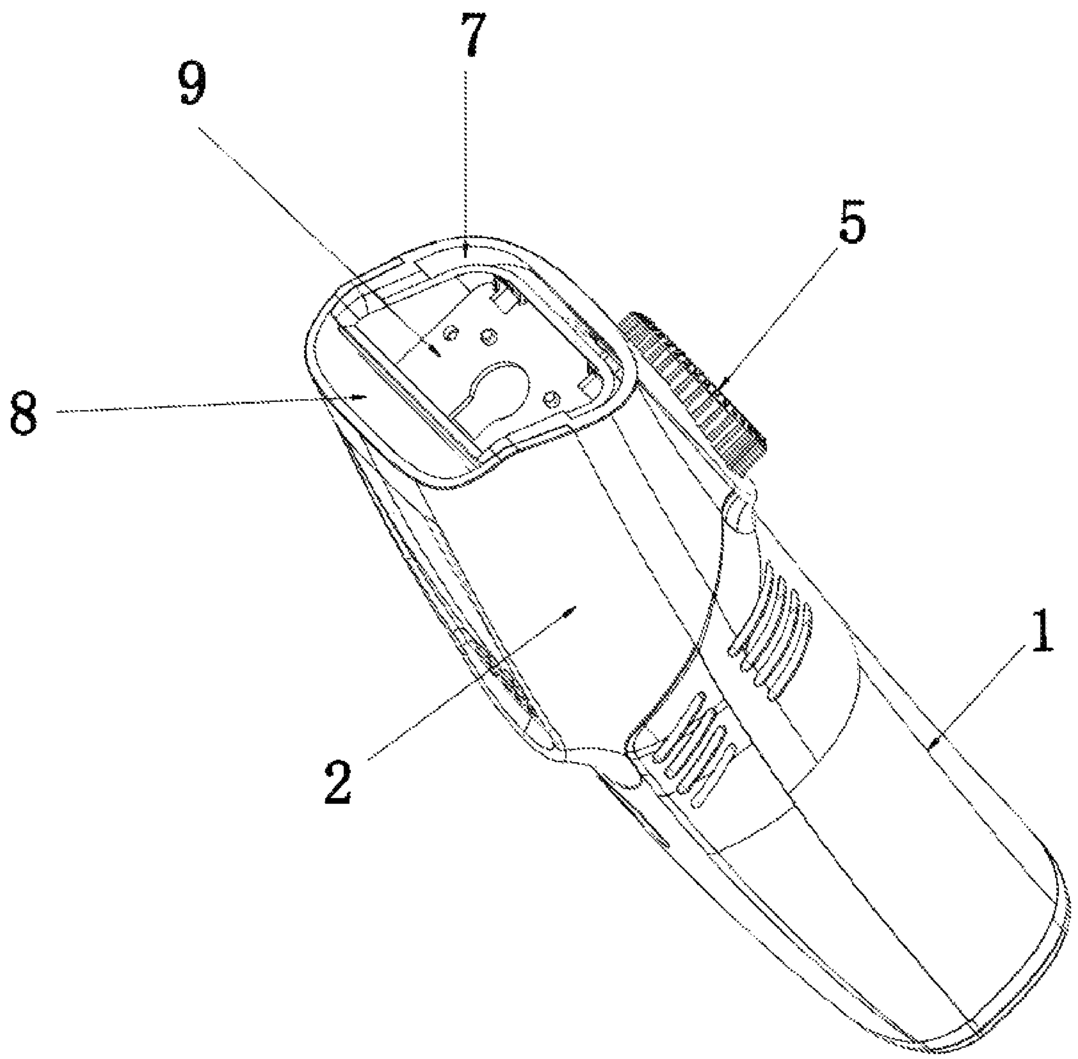
FIG. 4 is the structural diagram of the invention after the shaver component is further removed.
Figure 5:
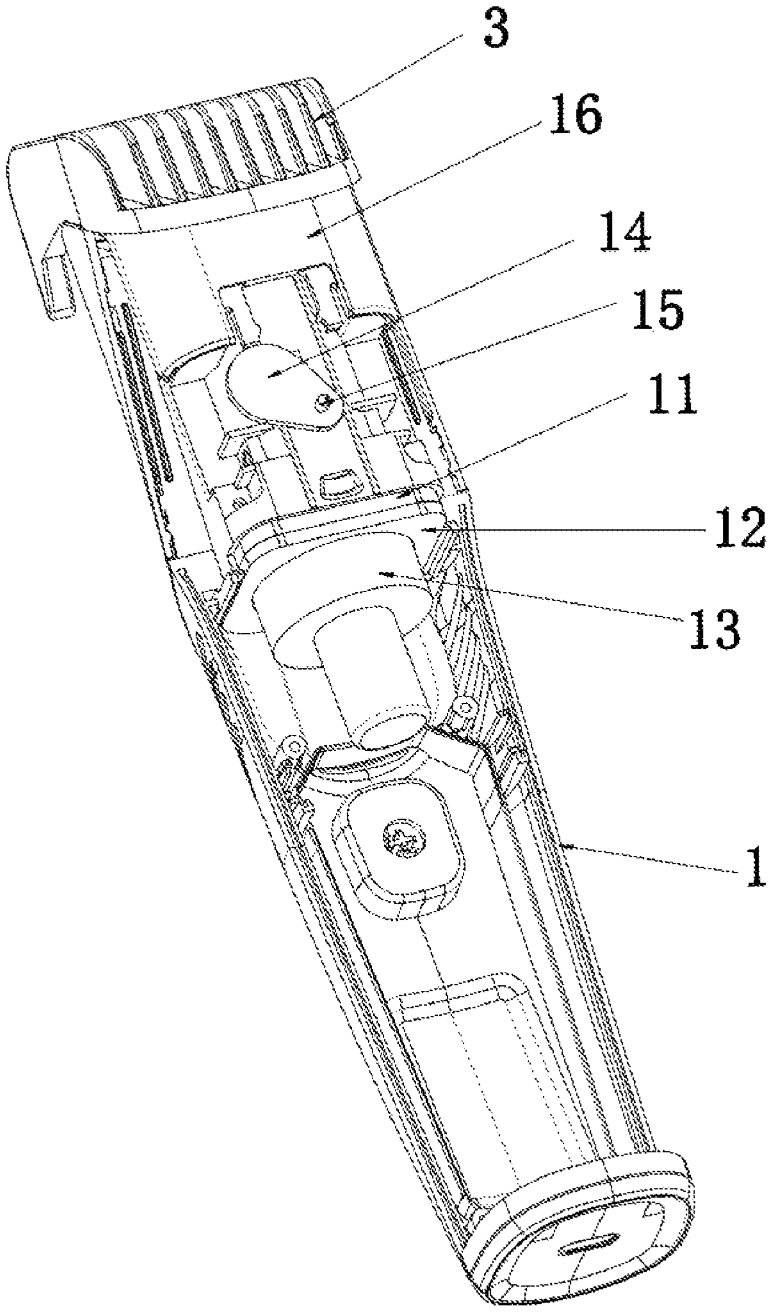
FIG. 5 is the assembly drawing inside the housing of the invention.
Figure 6:
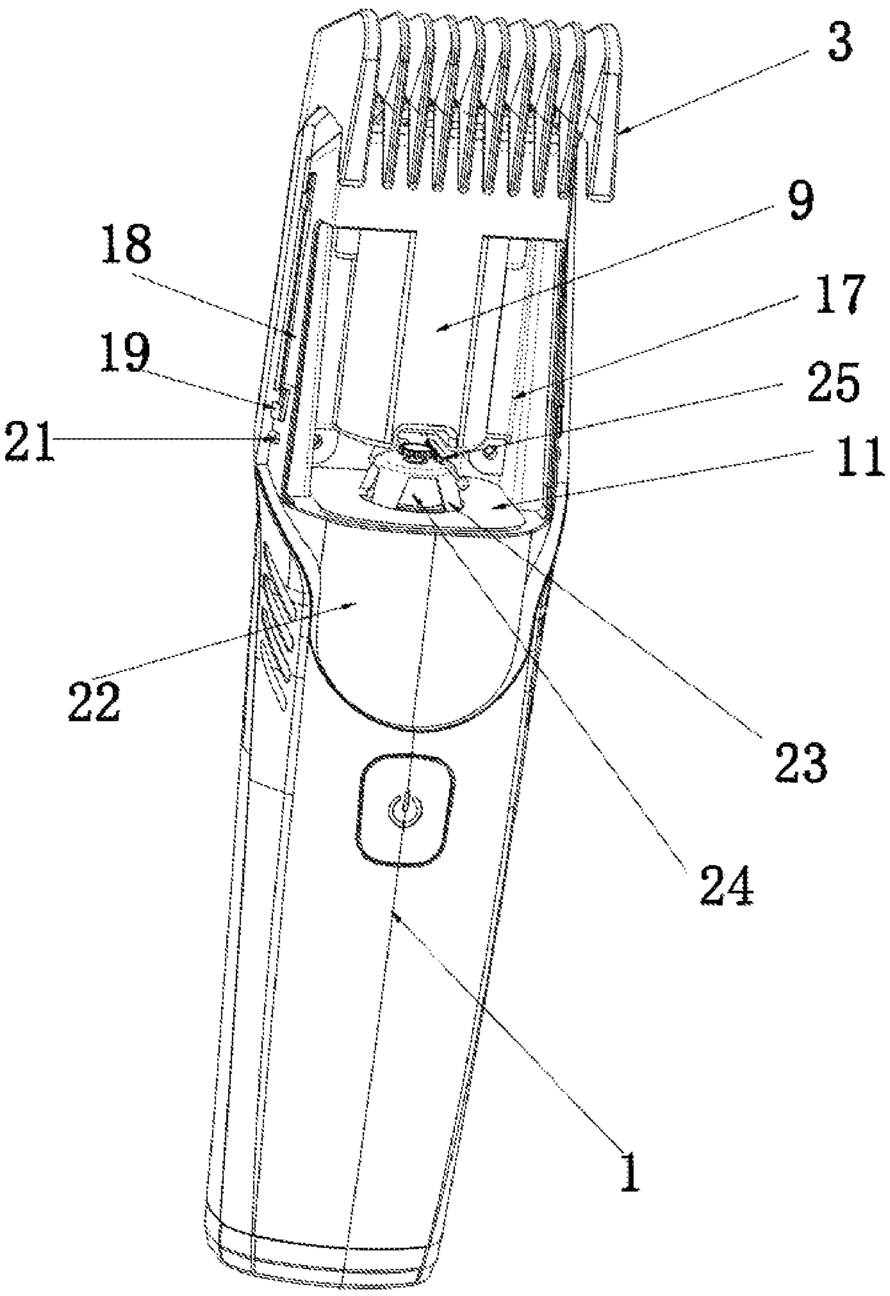
FIG. 6 is the structural diagram of the invention after the surface cover is opened.
Figure 7:
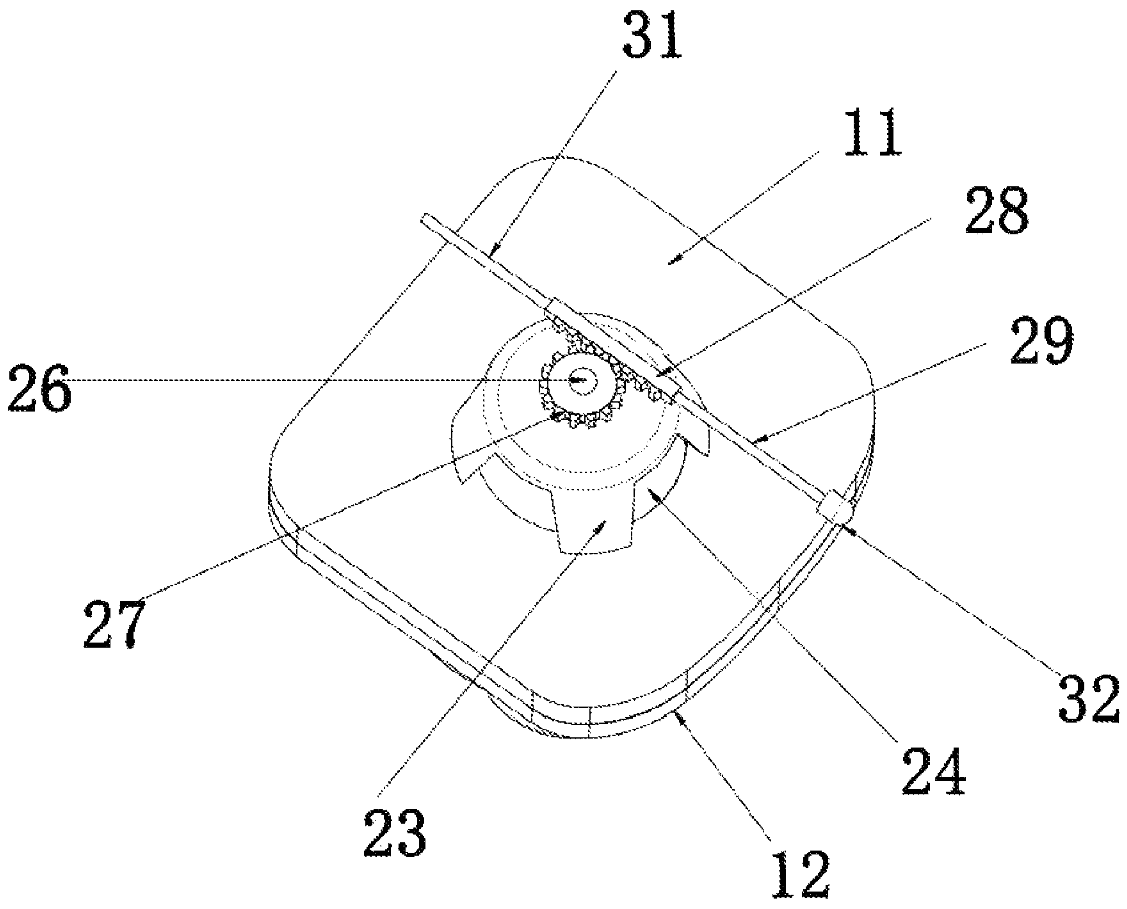
FIG. 7 is the structural diagram of the cleaning mechanism of the invention.
Figure 8:
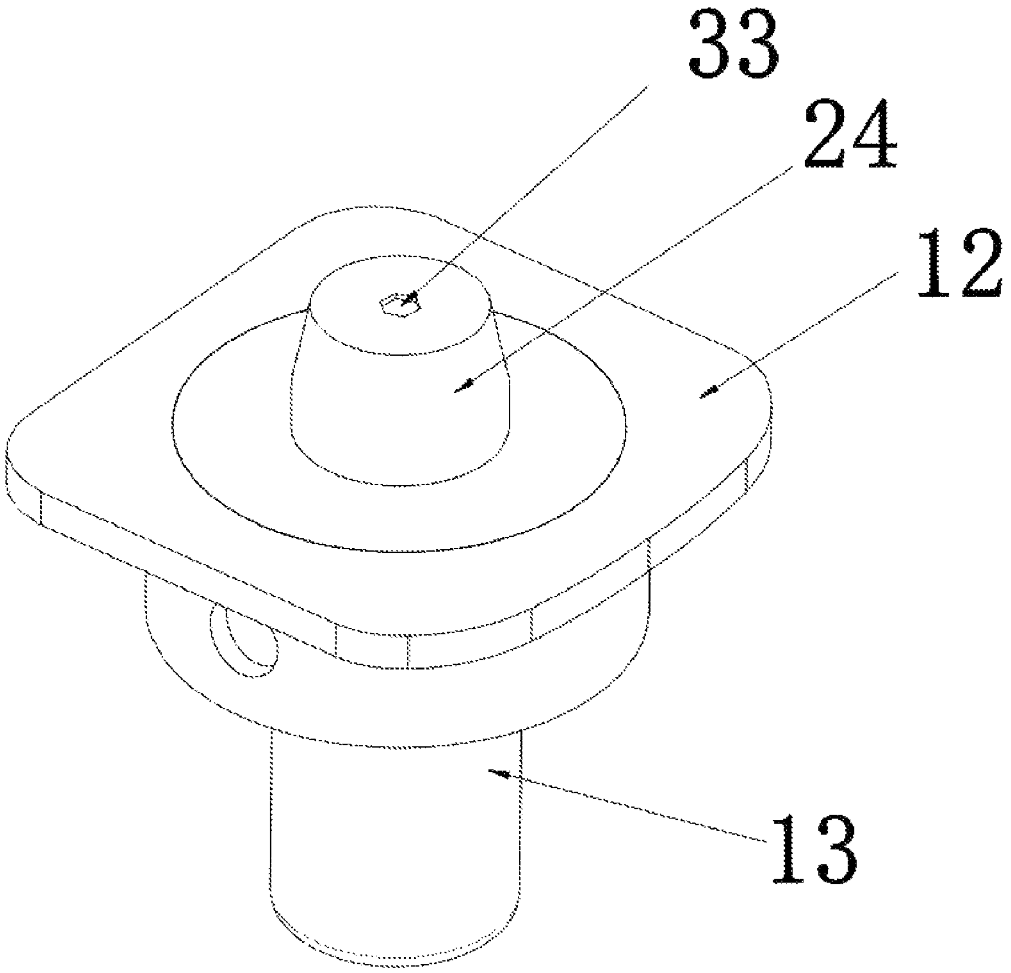
FIG. 8 is the structural diagram of the filtering mesh cover of the invention.

As shown in FIG. 1, FIG. 2, FIG. 3, FIG. 4, FIG. 5, FIG. 6, FIG. 7, and FIG. 8, a dust-absorbing electric shaver, comprising a housing 1, a shaver component 6, and a surface cover 2; the top of said housing 1 is provided with a fixed shell, and the shaver component 6 is mounted on the top of fixed shell; a collection slot 17 is formed between the front of housing 1 and fixed shell for collecting beard residue, a panel 11 is provided in the front of collection slot 17, and a collection chamber is formed between the panel 11 and collection slot 17; the bottom surface of the collection chamber is provided with a mounting hole that is connected to the interior of the housing 1; the panel 11 and positioning plate 12 are provided in the mounting hole, a filtration component is provided in the middle of the panel 11, and a cleaning mechanism 25 is installed above the filtration component to rotate the filtration component and remove excess beard residue on the surface; the bottom surface of the positioning plate 12 is mounted with an aspirator pump 13 that absorbs beard residue generated in the shaving process into the interior of the collection chamber.

In the embodiment, the filtration component includes a conical shell 23 and a conical filtering mesh cover 24, wherein the conical shell 23 is mounted in the middle of the panel 11, the and middle of the panel 11 is provided with an air inlet hole connected with the conical shell 23; the middle of the positioning plate 12 is provided with a vent hole, and the inner diameter of the vent hole is smaller than the air inlet hole; the outside of the positioning plate 12 is mounted on the inner wall of the housing 1, the filtering mesh cover 24 is provided inside the conical shell 23, and the open end of the filtering mesh cover 24 passes through the air inlet hole and is placed on the top surface of the positioning plate 12, and the outer ring surface of the filtering mesh cover 24 is in contact with the inner ring surface of the conical shell 23; the cleaning mechanism 25 is set on the top of the conical shell 23 and is movably connected with the filtering mesh cover 24.

In the embodiment, the cleaning mechanism 25 includes a positioning rod 31, gear racks 28, a gear 27, a rotary shaft 26, a push rod 29, and the first sealing bearing; the top surface of the conical shell 23 is provided with a through hole, and the first sealing bearing is mounted in the through hole; the rotary shaft 26 is mounted in the inner ring of the first sealing bearing, and one end of the rotary shaft 26 protrudes out to form a positioning portion; a positioning groove 33 is provided on the top surface of the filtering mesh cover 24 to match the positioning portion, and the positioning portion is inserted into the positioning groove 33; the other end of the rotary shaft 26 is fixedly connected with the gear 27, and gear racks 28 are set on one side of the gear 27 and meshed with the gear 27; the push rod 29 is installed at one end of the gear racks 28, and the other end of the push rod 29 is installed with a squeeze ball 32; the outer ring surface of the squeeze ball 32 is pressed against the inner side of the surface cover 2, and the other end of the gear racks 28 is provided with a positioning hole; one end of the positioning rod 31 is inserted into the positioning hole and is mounted with a compression spring, and the other end of the compression spring is installed in the inner surface of the positioning hole; the other end of the positioning rod 31 is installed in the inner surface of the housing 1, and the compression spring is in a compressed state.

Wherein, after the surface cover is opened, the panel can be lifted upward so that the panel can be removed from the mounting hole and removed out along the open collection slot, wherein the lower part of the filtering mesh cover is just placed on the positioning plate, so that the filtering mesh cover can be removed downward directly after the panel is removed out;

And the upper end of the filtering mesh cover is in inserted connection with the positioning portion through the positioning groove, so when the rotary shaft rotates, the filtering mesh cover can be driven to rotate through the positioning portion, and the friction between the filtering mesh cover and conical shell in rotating process can scrape away the impurities on the outer surface of the filtering mesh cover.

In the embodiment, the top surface of the fixed shell is sunken to form the fixed groove 9, and the bottom surface of the fixed groove 9 is provided with a plurality of slots; the lower end of the shaver component 6 is inserted into the fixed groove 9, and the bottom surface of the shaver component 6 directly opposite to slots protrudes to form snapping blocks, and the snapping blocks are inserted into the slots; the interior of the fixed shell is installed with a micro electric motor to drive the moving blades in the shaver component 6 to realize shaving operation.

In the embodiment, a "U" shaped adjustment channel 7 is formed between the top surface of housing 1 and the fixed shell, and a "U" shaped adjustment plate 16 is provided in the adjustment channel 7; the upper end of the adjustment plate 16 extends to the outside, and a comb 3 is installed to adjust shaving length; inside the housing 1, an eccentric wheel 14 is located below the adjustment plate 16 to push the adjustment plate 16 upward, and a shaft lever 15 is mounted on the eccentric wheel 14; and a shaft hole is provided on the outer side of the housing 1 directly opposite to the shaft lever 15, and a second sealing bearing is mounted inside the shaft hole; one end of the shaft lever 15 is mounted in the inner ring of the second sealing bearing, and extending outward with an adjustment knob 5 mounted thereon.

In the embodiment, an impurity absorption channel 8 for absorbing beard residue generated outside into the interior of the collection chamber is formed between the top surface of the housing 1 and the surface cover 2.

In the embodiment, the housing 1 is located on both sides of the collection slot 17 and is sunken to form a connection groove 18, the bottom of the connection groove 18 is sunken to form an assembly groove 22 connected to the collection slot 17; both sides of the surface cover 2 are bent inwardly to form side portion, and the side portion is inserted into the connection groove 18 and is fastened to the connection groove 18 by snap-fit; the bottom of the surface cover 2 is protruded to form the assembly portion, and the assembly portion is inserted into the assembly groove 22; the surface of the surface cover 2 is sunken to form a groove to push the surface cover upwardly, and plurality of bumps that increase friction are protruded on the inner wall surface of the groove.

Wherein, a plurality of L-shape portions 19 and a plurality of first fastening stripes 21 protrude on the connection groove, a plurality of vertical positioning strips are provided on the inner surface of the side panel, the positioning stripes being able to be inserted into the L-shape portions 19 from the top to the bottom, thereby positioning the panel front to back; a plurality of second fastening stripes are provided on the inner surface of the side panel, the second fastening stripes are able to pass through the first fastening stripes 21 during insertion from the top to the bottom, thereby being snapped to be under the first fastening stripes 21, thereby positioning the surface cover up and down.

In the embodiment, a plurality of exhaust ports 14 are provided on both sides of the housing 1 on the outside of the aspirator pump 13; the filtering mesh cover is the inlet end of the aspirator pump and the exhaust port is the outlet end of the aspirator pump, which enables the aspirator pump to achieve convection so that the external beard can be quickly sucked into the collection chamber along the impurity absorption channel.

In the embodiment, the panel 11 is provided at the upper end of the top plate, and the bottom surface of the panel 11 is embedded with a plurality of metal sheets, the top surface of the top plate directly opposite to the metal sheets is embedded with magnets, and the panel 11 is magnetically fixed to the magnets on the positioning plate 12 through the metal sheets.

When used, the height of the comb is changed according to the length of shaving, and when adjusting, the adjustment knob directly rotates the rotating shaft, and the rotation of the rotating shaft drives the eccentric wheel, and the clockwise rotation of the eccentric wheel pushes the adjustment plate upward, so that the adjustment plate is moved upward along the adjustment channel and the comb is driven, which can change the distance that comb stretches out, so as to change the distance between the comb and the shaver component, accordingly performing shaving with different lengths.

After the above is determined, the electric shaver can be directly activated, thereby driving the moving blade on the shaver component to move back and forth, and the excess beard can be directly cut off through the cross movement with the fixed blade;

In the process of shaving, the aspirator pump can be started, and the absorption force generated by the aspirator pump can act in the collection chamber, so that the beard residue generated outside enters into the collection chamber along the impurity absorption channel and is intercepted by the filtering mesh cover, so that the beard residue can be retained in the collection chamber, and the gas can be discharged through the exhaust port;

In subsequent cleaning of the beard residue, the comb can be pulled out first, and fingers are pressed against the bumps to push the surface cover upward to make it separated from the connection slot, and after the surface cover is removed, the impurities inside the collection slot can be poured out directly, and the inside surface of the surface cover can be cleaned;

Wherein, after the surface cover is removed, the outer side of the push rod will lose its blockage, at which time, the gear racks can be pushed outward by the rebound of the compression spring, causing the gear racks to move, and one end of the racks drives the gear, and the rotation of the gear drives the rotary shaft and the filtering mesh cover, so that friction can be generated between the outer ring surface of the filtering mesh cover and the inside surface of the air inlet on the conical cover, so as to scrape off the residual impurities on the filtering mesh cover, avoiding clogging and affecting the quality of the dust absorption;

Conversely, after the surface cover is covered again, the inside surface of the surface cover can once again press the squeeze ball and push the push rod inward; the movement of the push rod once again pushes the gear racks, and the movement of the gear racks once again pushes the rotation of the filtering mesh cover, thus further removing the installation of the filtering mesh cover on the outer surface.

The invention and its embodiments have been described above, but the description is not limited thereto; only one embodiment of the invention is shown in the drawings, and the actual structure is not limited thereto. In general, it is to be understood by those skilled in the art that non-creative design of structural forms and embodiments that are similar to the technical solutions without departing from the spirit of the invention shall all fall within the protective scope of the invention.

The invention claimed is:

1. A dust-absorbing electric shaver, comprising a housing, a shaver component, and a surface cover; the top of said housing is provided with a fixed shell, and the shaver component is mounted on the top of fixed shell; a collection slot is formed between the front of housing and fixed shell for collecting beard residue, a panel is provided in the front of collection slot, and a collection chamber is formed between the panel and collection slot; the bottom surface of the collection chamber is provided with a mounting hole that is connected to the interior of the housing; the panel and positioning plate are provided in the mounting hole, a filtration component is provided in the middle of the panel, and a cleaning mechanism is installed above the filtration component to rotate the filtration component and remove excess beard residue on the surface; the bottom surface of the positioning plate is mounted with an aspirator pump that absorbs beard residue generated in the shaving process into the interior of the collection chamber.

2. The dust-absorbing electric shaver of claim 1 wherein the filtration component includes a conical shell and a conical filtering mesh cover, wherein the conical shell is mounted in the middle of the panel, the and middle of the panel is provided with an air inlet hole connected with the conical shell; the middle of the positioning plate is provided with a vent hole, and the inner diameter of the vent hole is smaller than the air inlet hole; the outside of the positioning plate is mounted on the inner wall of the housing, the filtering mesh cover is provided inside the conical shell, and the open end of the filtering mesh cover passes through the air inlet hole and is placed on the top surface of the positioning plate, and the outer ring surface of the filtering mesh cover is in contact with the inner ring surface of the conical shell; the cleaning mechanism is set on the top of the conical shell and is movably connected with the filtering mesh cover.

3. The dust-absorbing electric shaver of claim 2 wherein the cleaning mechanism includes a positioning rod, gear racks, a gear, a rotary shaft, a push rod, and the first sealing bearing; the top surface of the conical shell is provided with a through hole, and the first sealing bearing is mounted in the through hole; the rotary shaft is mounted in the inner ring of the first sealing bearing, and one end of the rotary shaft protrudes out to form a positioning portion; a positioning groove is provided on the top surface of the filtering mesh cover to match the positioning portion, and the positioning portion is inserted into the positioning groove; the other end of the rotary shaft is fixedly connected with the gear, and gear racks are set on one side of the gear and meshed with the gear; the push rod is installed at one end of the gear racks, and the other end of the push rod is installed with a squeeze ball; the outer ring surface of the squeeze ball is pressed against the inner side of the surface cover, and the other end of the gear racks is provided with a positioning hole; one end of the positioning rod is inserted into the positioning hole and is mounted with a compression spring, and the other end of the compression spring is installed in the inner surface of the positioning hole; the other end of the positioning rod is installed in the inner surface of the housing, and the compression spring is in a compressed state.

4. The dust-absorbing electric shaver of claim 1 wherein the top surface of the fixed shell is sunken to form the fixed groove, and the bottom surface of the fixed groove is provided with a plurality of slots; the lower end of the shaver component is inserted into the fixed groove, and the bottom surface of the shaver component directly opposite to slots protrudes to form snapping blocks, and the snapping blocks are inserted into the slots; the interior of the fixed shell is installed with a micro electric motor to drive the moving blades in the shaver component to realize shaving operation.

5. The dust-absorbing electric shaver of claim 1 wherein a “U” shaped adjustment channel is formed between the top surface of housing and the fixed shell, and a “U” shaped adjustment plate is provided in the adjustment channel; the upper end of the adjustment plate extends to the outside, and a comb is installed to adjust shaving length; inside the housing, an eccentric wheel is located below the adjustment plate to push the adjustment plate upward, and a shaft lever is mounted on the eccentric wheel; and a shaft hole is provided on the outer side of the housing directly opposite to the shaft lever, and a second sealing bearing is mounted inside the shaft hole; one end of the shaft lever is mounted in the inner ring of the second sealing bearing, and extending outward with an adjustment knob mounted thereon.

6. The dust-absorbing electric shaver of claim 1 wherein an impurity absorption channel for absorbing beard residue generated outside into the interior of the collection chamber is formed between the top surface of the housing and the surface cover.

7. The dust-absorbing electric shaver of claim 1 wherein the housing is located on both sides of the collection slot and is sunken to form a connection groove, the bottom of the connection groove is sunken to form an assembly groove connected to the collection slot; both sides of the surface cover are bent inwardly to form side portion, and the side portion is inserted into the connection groove and is fastened to the connection groove by snap-fit; the bottom of the surface cover is protruded to form the assembly portion, and the assembly portion is inserted into the assembly groove;

the surface of the surface cover is sunken to form a groove to push the surface cover upwardly, and plurality of bumps that increase friction are protruded on the inner wall surface of the groove.

8. The dust-absorbing electric shaver of claim 1 wherein a plurality of exhaust ports are provided on both sides of the housing on the outside of the aspirator pump.

9. The dust-absorbing electric shaver of claim 1 wherein the panel is provided at the upper end of the top plate, and the bottom surface of the panel is embedded with a plurality of metal sheets, the top surface of the top plate directly opposite to the metal sheets is embedded with magnets, and the panel is magnetically fixed to the magnets on the positioning plate through the metal sheets.

* * * * *